T. B. TIEFENBACHER.
TIRE TREAD.
APPLICATION FILED SEPT. 5, 1914.

1,161,549.  Patented Nov. 23, 1915.

Witnesses:

Inventor
Thomas B. Tiefenbacher
By his Attorney
C. P. Goepel

UNITED STATES PATENT OFFICE.

THOMAS B. TIEFENBACHER, OF NEW YORK, N. Y.

TIRE-TREAD.

1,161,549.  Specification of Letters Patent.  Patented Nov. 23, 1915.

Application filed September 5, 1914. Serial No. 860,435.

*To all whom it may concern:*

Be it known that I, THOMAS B. TIEFENBACHER, a citizen of the United States, and resident of the borough of Manhattan, city and State of New York, have invented certain new and useful Improvements in Tire-Treads, of which the following is a specification.

This invention relates to tire-treads, and has for its object to provide an improved tread, which will, by its application to a tire, bring about an even distribution of the wear upon the same, and thereby prolong the life of the tire.

Hitherto in the use of tires of well known make, the peripheral portion thereof, forming the tread, was usually made of rubber, and this became worn from a rounded portion to a flat portion, and thereafter any pressure exerted on the flattened portion would cause the various layers of fabric forming part of the tire to be pressed radially inwardly out of their curved normal position to a flattened or abnormal position. This flattening of the layers of fabric would cause friction of one layer on another, and would soon result in deterioration of the tire.

The object of this invention is to overcome this disadvantage, and to provide a tread which, when applied to tires of any ordinary or well known make, will have a flat exterior surface, and be worn flat thereafter, and as thus worn flat will not cause the curved part of the tire to be pressed inwardly and subjected to the disadvantageous frictional action referred to, and the excessive kneading of the rubber in all directions.

Figure 1:
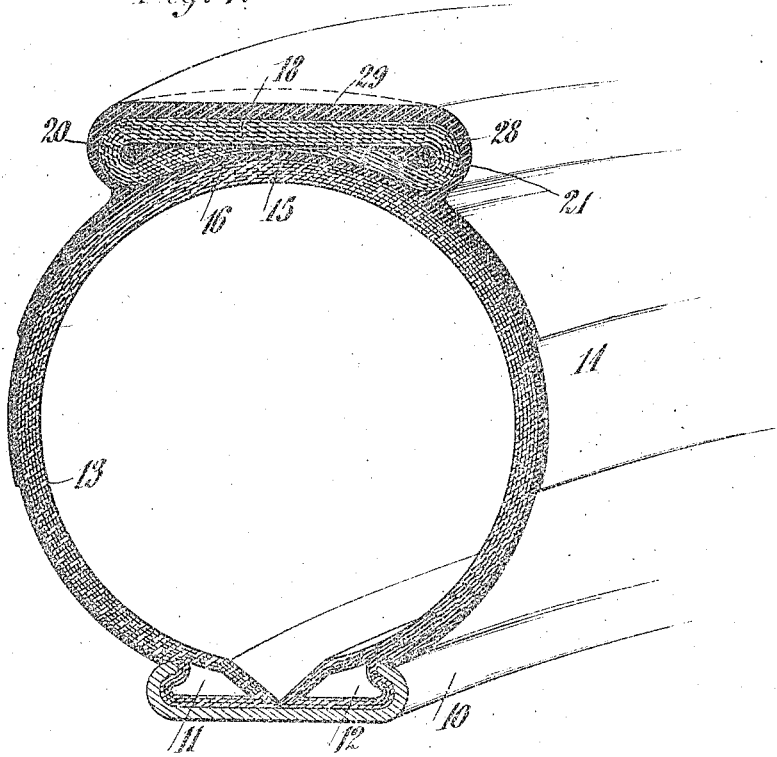
Figure 2:
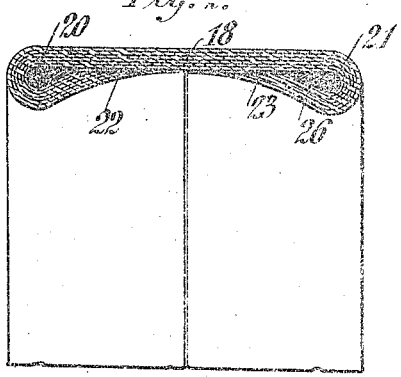
Figure 3:
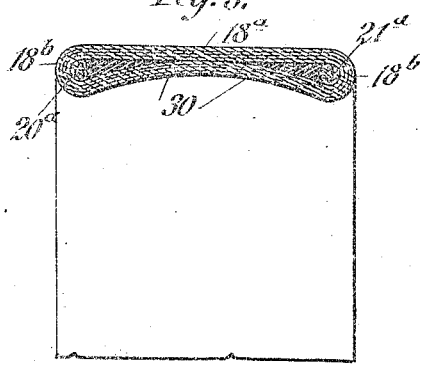

In the accompanying drawing, Figure 1 is a vertical section of a tire of approved make, having applied thereto a tread embodying the invention, Fig. 2 is a section of the tread before it is placed on the tire, and Fig. 3 is a section of the tread showing the layers of fabric forming the same arranged in a different manner from the arrangement shown in Figs. 1 and 2.

Similar reference numerals indicate corresponding parts throughout the various views.

Referring to the drawing, and more particularly to Fig. 1, the rim 10 is of the usual form, and instead of the particular form shown in Fig. 1, any other approved form may be used. This rim supports the beads 11 and 12 of the tire 13, which tire has a circular cross-section and is composed of a plurality of layers or plies of fabric coacting with layers 14 of rubber. The tire is shown conventionally in Fig. 1, and it is clear that any type of tire having a rounded periphery may be used. At the peripheral portion 15 of the tire 13, a layer 16 of rubber is provided, on which is placed my improved tread, which comprises a plurality of layers of fabric 18 of increasing width upwardly, extending from one side of the peripheral portion of the tire to the other side thereof, and passing at either side over alining members 20 and 21, and extending at their free ends 22 and 23 below the layers 18. The alining members 20 and 21 are preferably made of Sea Island cotton rope, and said ropes 20 and 21 extend circumferentially around the entire tire, one at each side of the peripheral portion 15. The ends 22 and 23 of the tread snugly fit against the lower portion of the layers 18, and a suitable quantity of rubber, indicated by 26, serves to bind the ends 22 and 23 to the layers 18, and to the rope alining-members 20 and 21, said rubber 26 filling all the inclosed space not filled by the rope. The tread thus formed, as shown in Fig. 2, is then applied to the exterior of the rubber layer 16 of the tire, and a rubber layer 28, having a flat tread portion 29 and downwardly extending portions 30, is formed around the tread, so as to complete the tire, and to protect the fabric layers of the tread. When the improved tread is thus applied to the tire, and secured thereto, by vulcanization or other means, so as to become an integral part of the tire, the entire tire with the improved tread is ready to be used. In use, such an improved tire has the advantage that all weight which is applied to the tread portion 29 is evenly divided along the width of the same, and consequently along the width of the layers 18, and the circumferentially-extending ropes 20 and 21 serve to assist in the proper distribution of the forces applied to the tread portion 29. The rope portions 20 and 21 serve also to fill in the gaps formed by the bending under of the ends of the layers 18, and prevent thereby these bent-under portions from kinking and thereby being destroyed by use. By thus distributing the forces applied to the tread portion 29, the curved peripheral portion 15 of the tire always maintains its curved shape, and does not become flattened as in the tires hitherto in use, and hence the various layers of fabric therein are not caused to frictionally move one in respect to the other, and thereby their deterioration is prevented. Thus, my improved tread, having the parallel layers 18 with the bent-under portions at either side thereof, serves to uniformly take up the various forces, and by remaining constantly in flattened shape, it is not unequally pressed inwardly, and so prevents the flattening of the curved peripheral portion 15.

In Fig. 3 is shown another embodiment of my improved tread portion, which consists in having the layers 18$^a$ bent at the points 18$^b$ around the ropes 20$^a$ and 21$^a$, and extended underneath the parallel layers 18$^a$, being curved in substantially the same curvature as the peripheral portion 15 of the tire. This curvature is shown clearly in Fig. 3, and is indicated by the character 30. An examination of the embodiment shown in Fig. 3 shows clearly that any forces that are applied to the parallel flat layers 18$^a$ are taken up thereby, and those that are transmitted to the curved portion 30 of the tread are distributed therein, bringing about a slight flattening of the layers forming this lower portion, but by having the forces taken up by the tread and the flat portion 18$^a$ and the curved portion 30 thereon, these forces are prevented from exerting themselves on the peripheral portion 15, and thereby this peripheral portion 15 is not flattened, and does not have the fabric layers thereof moved one in respect to the other, so as to produce a frictional engagement with the various layers which generates objectionable heat and results in the rapid deterioration of the tire.

In the embodiment shown in the drawings, the inside diameter of the tread is substantially the same as the diameter of the tire at the outside thereof, and the transverse curvature of the inner face of the tread is the same as the transverse curvature of the rounded outer portion of the tire, so as to enable a certain frictional hold to be obtained when the tread is applied to the main tire portion. The purpose of the invention is thus seen to be to take off the center of the tire the uneven weight, and distribute it over the surface of the tread and the surface of the tire under the tread, whereby longer life to both tire and tread is obtained, as the weight is uniformly distributed over the whole bottom facing surface of the tire. The construction as shown will not allow the rubber to crowd the tread toward the sides, as there is no decline toward the side of the tread, but the tread ends abruptly. The tread may be made in sections instead of continuously as shown in the drawings.

I have shown several embodiments of my invention, but it is clear that changes may be made therein without departing from the spirit of the same.

I claim as new:

1. An improved tire tread, comprising a plurality of superimposed layers of fabric of increasing width, a pair of spaced alining rope members enveloped by the sides of the layers of fabric forming a horizontal medial portion, the sides of the layers terminating adjacent the lower face of the horizontal medial portion, and lying parallel therewith, whereby the bent-under portions of the layers of fabric will assume an arcuate curvature.

2. The combination of a tire, and a tread member, comprising a plurality of laminated layers of fabric, the medial portion of the tread lying tangentially with the periphery of the tire, stiffening members enveloped by the side-portions of the tread, the free end portions of the layers adapted to conform to the outer configuration of the tire, and means for enveloping the tread member and the adjacent portion of the tire.

3. The combination with a tire, of a tread member, comprising a flattened portion formed of a plurality of layers of fabric, having their ends bent under to form inwardly-extending portions curved to shape themselves to the peripheral exterior portion of the tire, alining rope members enveloped by the said end portions at the edges of the tread members, the extremities of the end portions terminating in substantial contact with the flattened portion at a point adjacent each other, and a rubber filling interposed between the flattened portion and the bent-under ends of the tread.

4. The combination of a tire and a tread member, comprising a plurality of superimposed layers of fabric, and each layer being of gradually increasing length relative to the preceding layer, the layer forming the outermost one being the longest and the layers thereunder being gradually and successively shorter to the shortest innermost layer, and having a flattened portion and their ends bent under to form inwardly extending portions curved to shape themselves to the peripheral exterior portion of the tire, and having the extremities of the end portions terminating in substantial contact with the under side of the flattened portion at points adjacent to each other alongside the underside of the flattened portion and distanced from each other in correspondence with the difference in lengths of the layers, and a rubber covering surrounding the layers, a portion of the rubber covering being between the tire and the tread portion.

5. An improved tire tread, comprising a plurality of superimposed layers of fabric having a flattened portion wherein the layers are substantially parallel, the layer forming the outermost one being the longest, and the layers thereunder being gradually and successively shorter to the shortest innermost layer, and having their end portions bent under to form curved inwardly extending portions, the extremities of the end portions terminating along a straight line and in substantial contact with the innermost layer of the flattened portion, at points adjacent each other, and distanced from each other in correspondence with the difference in lengths of the layers, the ends of the longest layer meeting in substantial contact at the central portion of the flattened portion and alining members at the ends of the flattened portions and enveloped by the said end portions.

In testimony, that I claim the foregoing as my invention, I have signed my name in presence of two subscribing witnesses.

THOMAS B. TIEFENBACHER.

Witnesses:
  Jos. Bisband,
  F. Hogg.